Nov. 3, 1942.   L. F. CARTER ET AL   2,300,404
REMOTE READING MAGNETIC COMPASS
Filed Jan. 10, 1940   4 Sheets-Sheet 1

INVENTORS
LESLIE F. CARTER and
WILLIAM ANSCOTT
BY
Herbert H. Thompson
their ATTORNEY

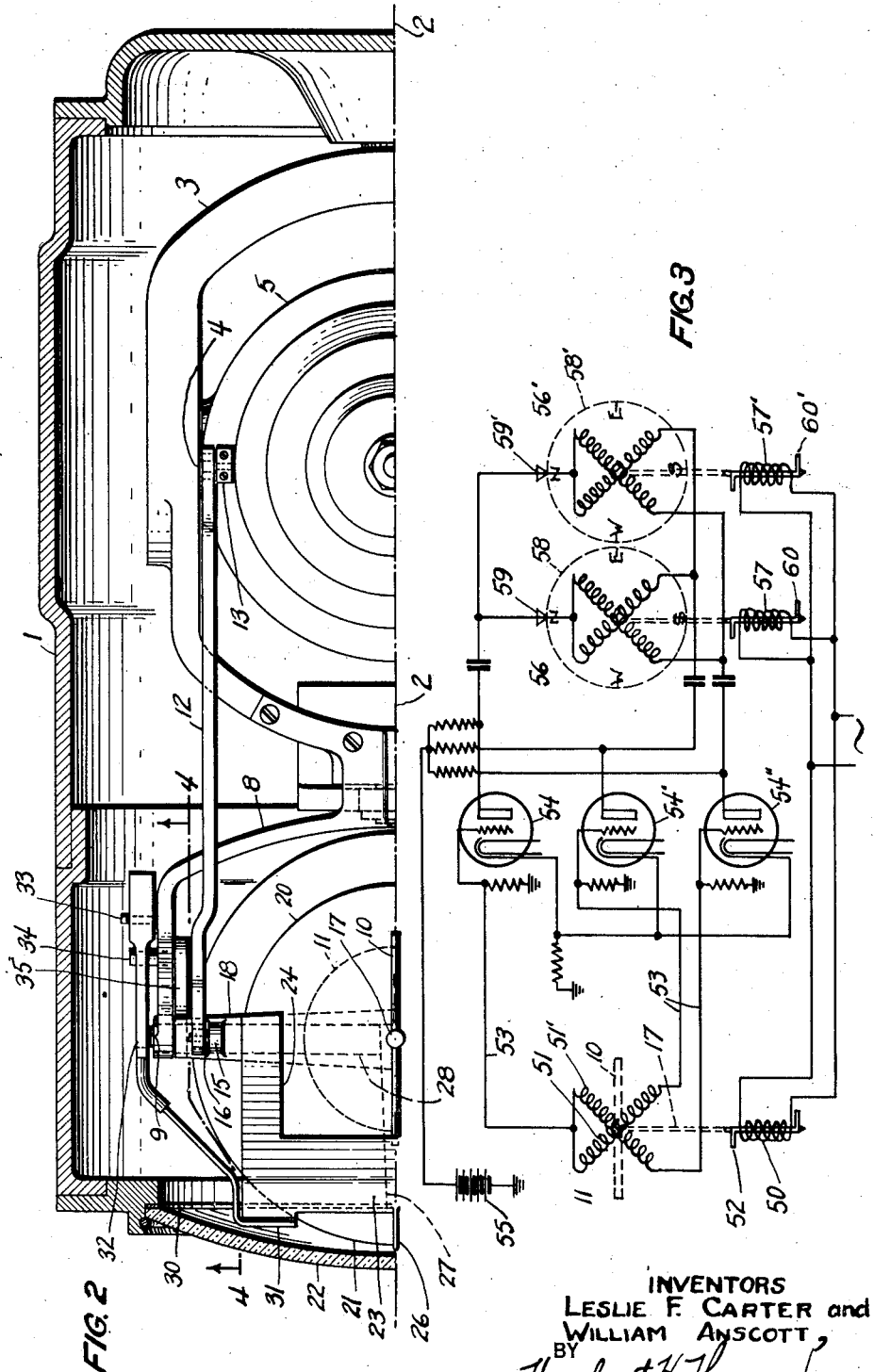

Nov. 3, 1942.   L. F. CARTER ET AL   2,300,404
REMOTE READING MAGNETIC COMPASS
Filed Jan. 10, 1940   4 Sheets-Sheet 3

INVENTORS
LESLIE F. CARTER and
WILLIAM ANSCOTT
BY Herbert H. Thompson
their ATTORNEY

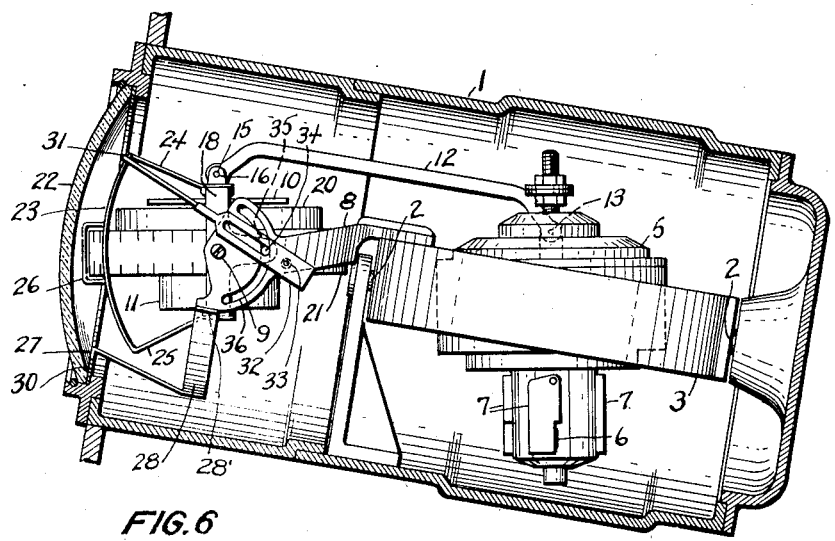

UNITED STATES PATENT OFFICE 2,300,404

REMOTE READING MAGNETIC COMPASS

Leslie F. Carter, Leonia, N. J., and William Anscott, Jamaica, N. Y., assignors to Sperry Gyroscope Company, Inc., Brooklyn, N. Y., a corporation of New York Application January 10, 1940, Serial No. 313,154

5 Claims. (Cl. 33—222)

This invention relates to a magnetic compass capable of transmitting to a distance its readings of position. While many attempts have been made to make a successful compass of this type, usually such attempts have resulted in such a complicated apparatus as to make the device impractical and the expense prohibitive.

In our invention we propose to mount the magnetic needle of the compass directly on the shaft of a special form of an alternating current (A. C.) self-synchronous transmitter whose moving element experiences low frictional resistance due to the absence of sliding contacts and in which little or no iron is employed. We then stabilize the transmitter and compass needle in both horizontal planes so that it is not disturbed by rolling and pitching of the vehicle on which it is mounted or by change of course, since the needle may be in this case perfectly balanced. In addition, we preferably interpose between the transmitter and the repeaters a blocking or one-way means to prevent any disturbance or out-of-phase position of any repeater from reflecting back or placing a load on the trasmitter. In this manner, and by employing special bearings, we impose no more load on the needle than the ordinary damping arrangement employed in liquid magnetic compasses. Also, by completely stabilizing the compass, we may employ the same not only to indicate azimuth position, but also tilt and pitch. In other words, our instrument really shows attitude in all three planes and preferably transmits such multiple attitudes.

Other objects and accomplishments of our invention will become apparent from the following description and claims.

Referring to the drawings showing several of the many forms our invention may assume:

Fig. 2 is a horizontal section through the said case looking down on the gyroscope and compass needle, only half the view being shown.

Fig. 3 is a wiring diagram showing connections between the transmitter and receivers, together with the blocking device.

Fig. 6 is a sectional elevation similar to Fig. 1, but on a smaller scale showing the position of the elements during a descent or glide.

Fig. 8 is a sectional detail taken on line 8—8 of Fig. 7.

Figure 1:
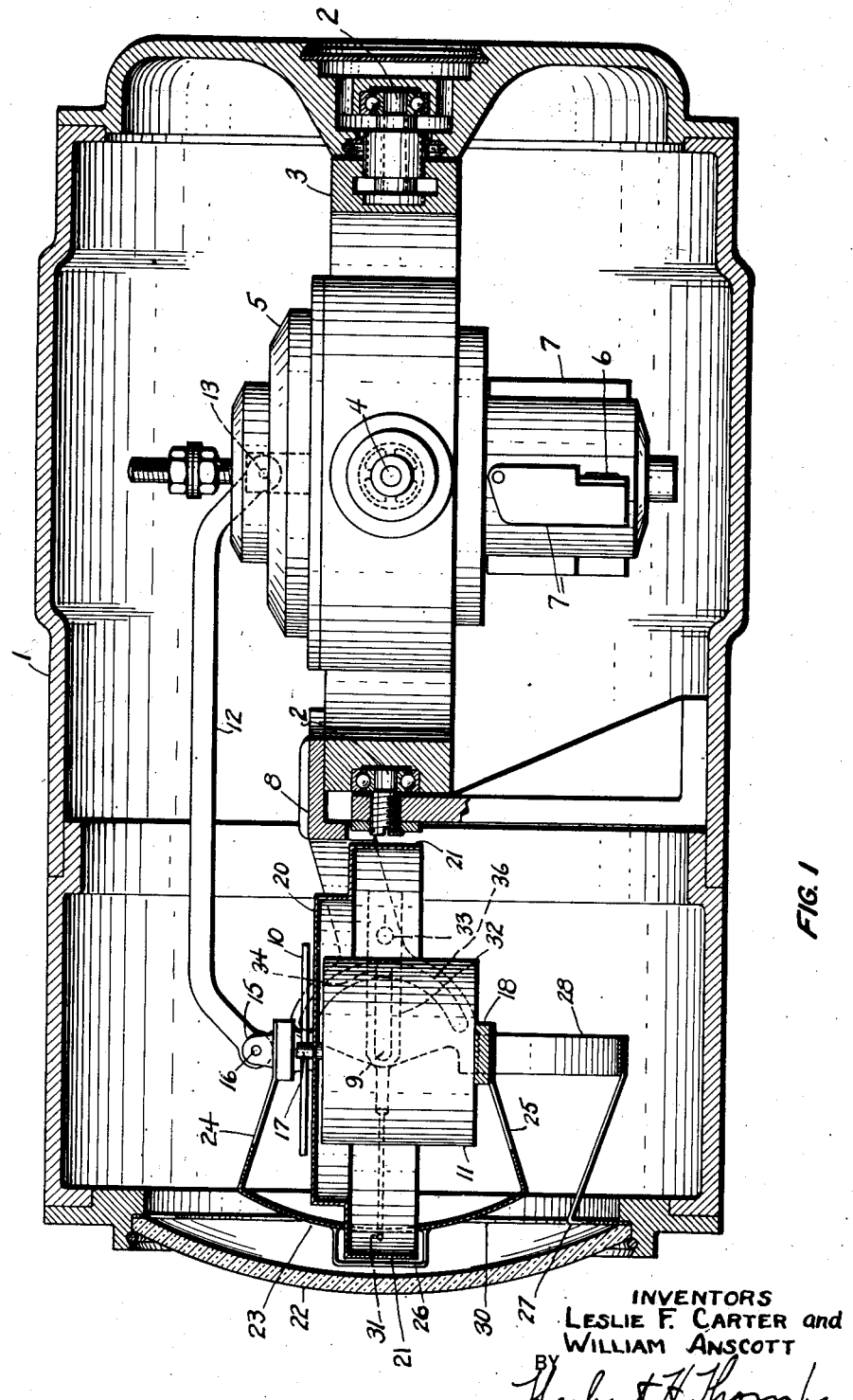
Fig. 1 is a vertical section, partly in elevation, through the casing of our stabilized remote reading magnetic compass.

Our stabilized compass is shown as mounted within an outer casing 1, within which is pivoted on a fore and aft axis 2—2, a gimbal ring 3 which pivotally mounts on a horizontal axis 4—4 a rotor bearing frame or casing 5 of a gyroscopic artifical horizon which acts to stabilize the magnetic needle and its transmitter. The gyroscope is shown as a standard gyroscopic artificial horizon which is neutrally mounted to maintain the vertical by a system of air jets emerging from ports 6 at the bottom of the gyro case, controlled by pendulous shutters 7 pivoted thereon, as well known in the art.

To the gimbal ring 3 we secure a forwardly extending U-shaped frame 8 which is therefore stabilized about the fore and aft axis 2—2. This frame pivotally supports on a transverse axis 9—9, parallel to axis 4—4, a magnetic compass element 10 and its transmitter 11, the latter being supported on a U-shaped bracket 18 extending under the transmitter and pivoted on each side at 9—9 to U bracket 8. In order to stabilize the compass about the axis 9—9, we connect bracket 18 to the gyro casing 5 by means of a link 12 pivotally connected to the gyro casing at 13 and pivotally connected at 16 to an upward extension 15 near one end of bracket 18. The transmitter 11 is shown as having a vertical shaft 17 to which the magnetic needle 10 is directly secured. It will be understood that said shaft 17 is pivotally mounted in vertically spaced anti-friction bearings (not shown) within the housing 11' of said transmitter. The compass needle and rotor 52 of said transmitter therefore have a common mounting which is stabilized in both planes from the gyroscope, the general principle of compass stabilization being the same as shown and broadly claimed in the prior patent of Leslie F. Carter, one of the joint applicants, and Mortimer F. Bates, No. 2,176,203, dated October 17, 1939, for Stabilized magnetic compasses.

To the shaft 17 is also secured a light, cup-like frame 20 which extends downwardly to form an annular card 21 lying in the horizontal plane of the gimbal axes 2—2, 4—4 and 9—9. This card may be read through the front window 22. A mask may also be provided to conceal the apparatus within the device and to aid in reading the compass and in showing roll and pitch. The mask is shown as having a square convex front 23 and is secured at its back through legs or brackets 24 and 25 to the frame 18. It is cut out in the middle to provide clearance for the compass card and is shown as having a short wire loop 26 extending around the compass card and forming the lubber line on which the compass card may be read. The entire mask therefore tilts and pitches with the apparent movements of gyroscope and compass, but does not turn in azimuth therewith.

To indicate roll of the ship, we have shown a pointer 27 located with its index at the lower part of the front window and secured at its rear to a semicircular loop 28 extending outside of bracket 18 and connected at its outer ends 28' to bracket 8 (Fig. 6). Pointer 27 is therefore unaffected by pitch but indicates roll only. Said index is shown as readable in connection with suitable markings 29 on graduated annular ring 30 back of the front window.

Figure 4:
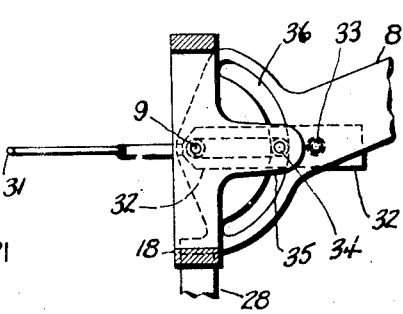
Fig. 4 is a sectional detail on line 4—4 of Fig. 2, looking in the direction of the arrows.

While we may use the apparent up and down movements of the compass card to show pitch, such movements are usually quite small and therefore not readily perceptible, and also are in the opposite direction from which the craft is actually pitching. We prefer, therefore, to indicate pitch by a separate pointer bar or pointers 31, each of which is mounted on an arm 32 pivoted on a pin 33 extending laterally from the bracket 8. Said arm is engaged and moved up and down by a second pin 34 which extends laterally from a part 35 secured to bracket or frame 16 and which extends through an arcuate shaped slot 36 in bracket 8 (see Fig. 4). Therefore, when the gyroscope apparently tilts in a counter-clockwise direction in Fig. 1, which would cause the front of the compass card to dip slightly, the indices 31 are moved upwardly a much greater distance in respect to the stationary indices 37 in the edges of the window through the mask 23 thereby indicating downward pitch of the craft, as clearly shown in Fig. 6.

Figure 7:
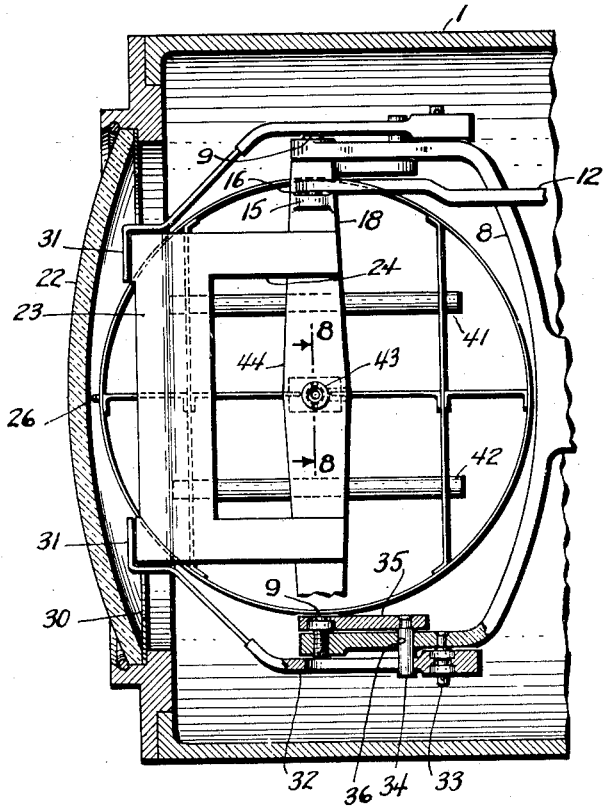
Fig. 7 is a plan view, partly in section, of the forward portion of a modified form showing how our invention could be applied to a magnetic compass without remote transmission.
Figure 5:
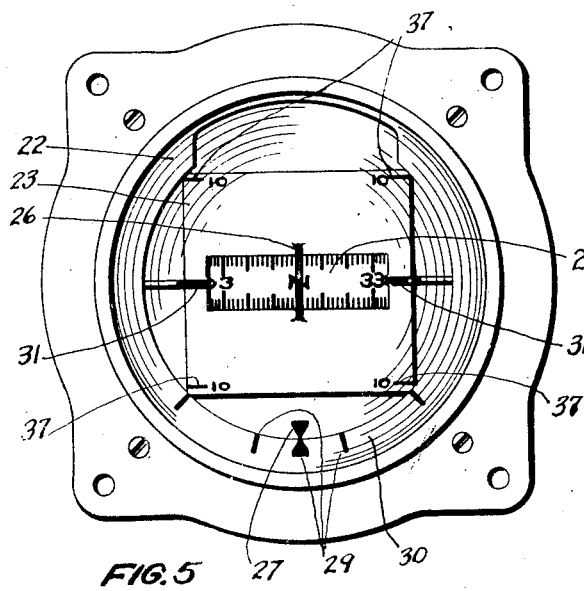
Fig. 5 is a face view of the instrument on a smaller scale.

Fig. 7 indicates a modified construction in which a pair of magnetic needles 41 and 42 are mounted in a common frame and pivoted about a vertical axis 43 at the top and bottom in jeweled bearings in the framework or compass mounting 44, similar to housing 11' and frame 18. This frame is stabilized in like manner from a link 12 connected to the gyroscope, and operates in the same manner as the other form of the invention.

Transmitter 11 is shown schematically in Fig. 3 as comprising an exciting winding 50 connected to an A. C. supply of suitable voltage and frequency and a pair of transmitting windings 51 and 51', the fields of the transmitting windings being disposed at right angles to one another and to that of the exciting winding. Winding 50 is magnetically coupled with windings 51 and 51' by means of Z shaped inductor 52 mounted on shaft 17 which carries magnetic needle 10. The angular position of the horizontal limbs of inductor 52 which are in a fixed relationship to needle 10 determines the relative distribution of flux between coils 51 and 51' and hence the relative voltages induced in these coils. The direction of the resultant field of the two transmitting windings therefore rotates with rotation of needle 10 and shaft 17 in the same manner as in other types of self-synchronous transmitters. Windings 50, 51, and 51' are on the stator of transmitter 11. Inductor 52, which is the rotor of the device, carries no winding and is free to rotate without the drag of sliding contacts. The movement of needle 10 is therefore retarded only by the very slight friction in the special anti-friction bearings in which shaft 17 is pivoted.

Windings 51 and 51' are connected, in a manner similar to that of the stator windings of a two-phase motor, to three outgoing leads 53 and thereby to the grids of the electron tubes 54, 54' and 54''. The output circuits of these tubes which are supplied with plate current by battery 55 are resistance coupled to the two phase windings of self-synchronous receivers 56 and 56', similar in construction to transmitter 11. The single phase or exciter windings 57 and 57' of these receivers, which are connected to the A. C. source supplying transmitter winding 50, magnetize inductors 60, 60' and cause said inductors to assume positions in which their horizontal limbs are aligned with the resultant fields of the corresponding two phase windings, the angular positions of the inductors being indicated by compass cards 58 and 58' on the inductor shafts, readable with the aid of indexes 59 and 59'.

Negligible currents are drawn from windings 51 and 51' by the grid circuits of tubes 54, 54' and 54'' and these small currents are unaffected by the departure of receiver 56 or 56' from a position of synchronism with the transmitter since the electron tubes are unilateral devices. Erroneous readings due to coercion of the transmitter by the receiver are thereby prevented by the use of these blocking tubes which also serve as amplifiers to supply more power to the receiver motors than could be directly drawn from a transmitter without introducing errors.

Since the position of compass needle 10 is disturbed by any distortion of the earth's magnetic field, we have found it desirable to eliminate magnetic material from the construction of transmitter 11 so far as is possible and particularly where such material tends to produce a magnetic field which is unsymmetrical with respect to the axis of the needle. Iron is therefore avoided as far as possible in the framework of the transmitter.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a remote reading magnetic compass, a gyro-vertical, a transmitter connected thereto to be stabilized thereby, comprising three mutually perpendicular stationary coils the axis of one of which is maintained vertical by said gyroscope, means for supplying said last named coil with alternating current, a rotor of permeable material mounted for turning about a vertical axis within the vertical coil and adapted on rotation to vary the relative transfer of flux between said vertical coil and said other two coils, a magnetic needle subject to the earth's field mounted on the shaft of said rotor, said transmitter being adapted to operate a remotely reading repeater compass, and a unilateral conduction means between said transmitter and repeater for preventing reaction from said repeater to said transmitter from disturbing the magnetic needle.

2. A remote reading magnetic compass system as claimed in claim 1, in which said unilateral conducting means includes an electronic tube in each of the wires connecting the transmitter and repeater, each having its input circuit connected to said transmitter and its output circuit connected to said repeater compass to thereby amplify the output of said transmitter and block reaction.

3. A flight indicator for aircraft comprising a laterally spaced, universally mounted gyro-vertical and magnetic compass, means connecting said gyro-vertical and compass to stabilize the latter about both horizontal axes, a card on said compass, a window through which said card is visible, a horizon indicator adjacent said window, and reversing linkage connecting said horizon indicator and gyro vertical causing said indicator to move in the reverse direction from the apparent movement of said card upon pitching of the craft, and also magnifying such movement.

4. A flight indicator for aircraft comprising a spaced, universally mounted gyro-vertical and magnetic compass, means connecting said gyroscope and compass to stabilize the latter about both horizontal axes, a card turned from said compass, a window through which said card is visible, a horizon indicator adjacent said window, an electric transmitter driven by said magnetic compass for transmitting the readings thereof and means including a blocking tube associated with said transmitter to prevent reactive forces on said compass.

5. A flight indicator for aircraft comprising a casing having a front window, a gyroscope mounted in the rear part of said casing, a magnetic needle, a bearing frame in the forward part of said casing pivotally supporting said needle for turning about a vertical axis in spaced bearings, a gimbal ring pivoted fore and aft in said casing on a horizontal axis, said gyroscope and said magnetic needle frame both being pivoted therein on spaced horizontal axes normal to said first horizontal axis, a compass card on said needle shaft visible through said window, a horizon indicator also visible through said window and pivotally mounted on said gimbal ring, and means connecting said needle bearing frame and said indicator for causing said horizon indicator to move in the reverse direction from the apparent movement of said card upon pitching of said craft, whereby said movement is magnified.

LESLIE F. CARTER.
WILLIAM ANSCOTT.